US007831043B2

(12) United States Patent
Lotspiech

(10) Patent No.: US 7,831,043 B2
(45) Date of Patent: Nov. 9, 2010

(54) SYSTEM AND METHOD FOR CRYPTOGRAPHICALLY AUTHENTICATING DATA ITEMS

(75) Inventor: Jeffrey Bruce Lotspiech, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 11/467,562

(22) Filed: Aug. 27, 2006

(65) Prior Publication Data

US 2008/0069353 A1    Mar. 20, 2008

(51) Int. Cl.
*H04L 9/00* (2006.01)
(52) U.S. Cl. .................................. 380/201
(58) Field of Classification Search ............ 380/201
See application file for complete search history.

(56) References Cited

U.S. PATENT DOCUMENTS

| 5,737,421 | A | 4/1998 | Audebert |
| 6,028,933 | A | 2/2000 | Heer et al. |
| 2006/0126831 | A1* | 6/2006 | Cerruti et al. ............... 380/30 |
| 2008/0205652 | A1* | 8/2008 | Nakano et al. ............. 380/277 |

FOREIGN PATENT DOCUMENTS

EP        1024626 A1    8/2000

OTHER PUBLICATIONS

Nakamura et al. "Efficient Key Management Based on the Subset Difference Method for Secure Group Communication", Proceedings of 19th Internation Conference on Advanced Information Networking and Applications, 2005. pp. 1-6.*
Lotspiech, "Anonymous Trust: Digital Rights Management Using Broadcast Encryption", Proceedings of the IEEE vol. 92, No. 6, 2004, pp. 1-12.*
Ramkumar, M.et al., "An Efficient Key Predistribution Scheme for Ad Hoc Network Security," IEEE Journal on Selected Areas in Communications, vol. 23, No. 3, Mar. 2005, pp. 611-621.
Dutta, Pk. et al., "Securing the Deluge Network Programming System," ISPN '06, Apr. 19-21, 2006, Nashville, Tennessee, USA, pp. 326-333.

(Continued)

*Primary Examiner*—Nasser Moazzami
*Assistant Examiner*—Lisa Lewis
(74) *Attorney, Agent, or Firm*—Samuel Kassatly; Shimokaji & Associates

(57) ABSTRACT

A cryptographic authentication system comprises an authentication media key block that comprises media key precursors. The system generates transformed keys by applying a function to a media ID of a media and each of the media key precursors, and generates entries in a binding table by applying an encrypting function to a media key of an encrypted content and each of the transformed keys. To play encrypted content, a media player processes the authentication media key block using a device key to extract a media key precursor, extracts a media key from the binding table using the extracted media key precursor and the media ID, and verifies that the extracted media key matches the media key of the encrypted content, allowing the media device to decrypt and play the encrypted content.

21 Claims, 9 Drawing Sheets

OTHER PUBLICATIONS

Karlof, C. et al., "TinySec: A Link Library Security Architecture for Wireless Sensor Networks," SenSys '04, Nov. 3-5, 2004, Baltimore, Maryland, USA, 2004, pp. 162-175.

Montenegro, G. et al., "Crypto-Based Identifiers (CBIDs): Concepts and Applications," ACM Transactions on Information and System Security, vol. 7, No. 1, Feb. 2004, pp. 97-127.

Patiyoot, D. et al., "Cryptographic Security Techniques for Wireless Networks," ACM SIGOPS Operating Systems Review archive, vol. 33, Issue 2, Apr. 1999, pp. 36-50.

Wallner, D., et al. "Key Management for Multicast: Issues and Architectures," 1999.

Naor, D., et al. "Revocation and Tracing Schemes for Stateless Receivers," Jun. 2002.

Fiat, A., et al. "Broadcast Encryption," CRYPTO '93 Proceedings, Lecture Notes in Computer Science, vol. 773, 1994, pp. 480-491.

Lotspiech, J., "Broadcast Encryption's Bright Future," IEEE, Aug. 2002, pp. 57-63.

Wong, C.K., "SecureGroupCommunicationsUsingKeyGraphs," IEEE/ACM Transactions on Networking, vol. 8, No. 1, Feb. 2000, pp. 16-30.

* cited by examiner

SYSTEM AND METHOD FOR CRYPTOGRAPHICALLY AUTHENTICATING DATA ITEMS

FIELD OF THE INVENTION

The present invention generally relates to broadcast encryption. More specifically, the present invention relates, for example, to broadcast encryption of content transferred to recordable media.

BACKGROUND OF THE INVENTION

Broadcast encryption refers to a set of cryptographic key management schemes whose common property is allowing two parties to agree upon a key without having a two-way conversation. Instead, the parties have a one-way flow of cryptographic data—hence the word "broadcast". In contrast, public-key cryptography systems require two-way handshakes between the parties before sharing a cryptographic key. One purpose of broadcast encryption and public-key cryptography is to protect content from unauthorized copying or distribution. Content comprises movies, audio, software, photographs, or any other digital information. Content is distributed via a media such as, for example, recordable disks comprising DVDs, etc.

In the short history of broadcast encryption, there has been a steady improvement in performance as new schemes of broadcast encryption have been introduced. For example, early conventional broadcast encryption schemes had a finite, albeit arbitrarily large, revocation capability. Another conventional broadcast encryption system has been introduced based on a tree-based scheme; this conventional approach has effectively unlimited revocation. For these conventional approaches, the broadcast encryption revocation information is substantially larger than a public-key revocation list for an equivalent amount of revocation. This broadcast encryption revocation information is referenced herein as a media key block. A further broadcast encryption scheme comprises a "subset-difference" scheme in which the media key block is of the same order of size as a revocation list.

Broadcast encryption comprises several characteristics. Broadcast encryption is one-way (hence "broadcast"); i.e., broadcast encryption does not require a two-way handshake for two parties to securely agree upon a cryptographic key. Broadcast encryption requires relatively few computational resources compared to public key calculations. Because the revocation information is inherently tied to the media key block and hence to the cryptographic key protecting content, broadcast encryption easily links revocation information and the content. Broadcast encryption is inherently anonymous; parties can prove they are compliant because they can correctly process the media key block. However, parties do not have to reveal anything else.

Because of these characteristics, broadcast encryption has become a technology of choice for content protection applications. In some cases, such as protected DVDs, broadcast encryption is essential because of its one-way nature. It is impossible to carry on a two-way conversation with a piece of plastic such as a DVD. However, even in other cases such as secure digital flash memory cards where two-way handshakes are possible, broadcast encryption is used for the other reasons stated above. To date, over 500 million consumer electronics devices have been manufactured using broadcast encryption such as content protection for recordable media (CPRM) and advanced access content system (AACS).

Although conventional broadcast encryption technologies have proven to be useful, it would be desirable to present additional improvements. Conventional broadcast encryption has not been able to mimic the digital signature function normally available in a public-key system. Instead, a conventional broadcast encryption system uses message authentication codes (MACs) to attest for the validity of messages in the system. In this context, a message authentication code comprises the following distinguishing properties:

Validity testing property—only valid participants in the system (those that have a set of broadcast encryption keys) can test the validity of a given message authentication code; and Identification property—Any valid participant can produce any message authentication code; a participant is not required to produce identification.

The validity testing property of conventional broadcast encryption is rarely a limitation in practical systems. The identification property allows the participants to operate anonymously while still proving that they are valid and compliant. Anonymity can be desirable in some applications; in particular, the copy protection application is usually cited as the prime example. For example, when a recording device makes an encrypted "do not copy" recording, the recording device is not concerned with an identity of a playing device that plays the recording. Rather, the recording device is only concerned with whether the playing device that plays the recording is compliant with distribution agreements and does not produce unauthorized copies.

In a copy protection application, however, there can be cases where anonymity is a disadvantage. Consider the case of the advanced access content system (AACS), the copy protection scheme for a new generation of high-definition blue-laser DVD movie discs. The advanced access content system is based on a subset-difference broadcast encryption scheme, referenced as "NNL" after the authors. The advanced access content system recognizes at least two types of DVD recordings: stream recording of content transmitted by television signals and prepared full-movie content via "electronic sell-through". Protection is required for the content transmitted by television signals because, for example, the content is provided by premium cable channels. The prepared full-movie content comprises rich navigation and bonus content. A consumer obtains the prepared full-movie content by downloading the prepared full-movie content from a server onto a recordable disk in the home of the consumer; this process is referenced as "electronic sell-through".

Any licensed recorder may record the content transmitted by the premium cable channel. However, only a relatively few servers are necessary to produce the disk images for the content comprising rich navigation and bonus content. In this application, additional security is desirable that enables a server to attest that a given recordable movie disk came from one of the legitimate servers and not from a circumvention device using broadcast encryption keys stolen from one of the millions of recorders.

This server attestation can be easily provided in a public-key system. A legitimate server has a properly signed digital certificate identifying the public key of the legitimate server. When the legitimate server downloads to a recordable disk the full-movie content, the certificate of server, and a signed token that affirms that the full-movie content recorded on the recordable disk came from the legitimate server. In other words, the legitimate server signs the unique serial number of the recordable disk. A compliant player does not play the full-movie content on the recordable disk unless the recordable disk has a validly-signed certificate and a validly-signed token that matches the serial number of the recordable disk.

Although public key encryption technologies have proven to be useful, it would be desirable to present additional improvements. In the application such as that of server downloading full-movie content to a recordable media, public-key calculations are inherently more onerous than broadcast encryption calculations. As an example, checking a signature in the standard public-key scheme chosen by the Advanced Access Content System takes 28,000,000 instruction, while checking a message authentication code takes 200 instructions. It is desirable to avoid this overhead in consumer electronics devices such as DVD players, which are very cost sensitive. Furthermore, broadcast encryption is necessary to calculate the cryptographic key that encrypts the full-movie content; it is not possible to conduct a public-key handshake with an inert piece of plastic like a DVD. To overlay the required broadcast encryption scheme with an additional public-key infrastructure is less efficient, more error-prone, and requires additional processing by the DVD player.

In some applications of broadcast encryption, not all participants are equally trusted and it is desirable to have a cryptographic proof of identity for at least some of the participants. For example, consider again the case of "electronic sell-through" in which content is downloaded onto a recordable DVD instead of selling the content as a prerecorded DVD in a store. Through well-known conventional mechanisms, the electronic sell-through server customizes the downloaded movie to the particular media ID on the recordable disk in the possession of the user. This process involves cryptographically binding the media ID of the recordable disk to the media key block in the movie, generating binding data that is written to the recordable disk. Compliant players only play the movie when this binding data is correct, so attackers cannot make extra copies by copying the movie to other discs. Each of the recordable disks has different media IDs burned in at manufacturing time and not changeable by the user.

However, any device with a set of device keys can produce that correct binding data because the device can calculate the media key in the media key block. For this particular purpose, only the server is required to calculate the media key in the media key block. The playing devices must calculate the media key to play the content correctly. If a set of attackers can obtain a set of unrevoked device keys, the attackers can set up a rogue server that can copy movies on demand. This attack has been referred to as the "Garage Replicator Attack". Any set of device keys may work; the anonymity of broadcast encryption is actually working against it in this application. The keys obtained by the attackers can be revoked, but only after determining which sets of device keys are being used by the attackers. What is needed is a way for the electronic sell-through the server to have special cryptographic status that allows only the authorized server to correctly perform the binding process.

Achieving this special cryptographic status for the electronic sell-through server is straightforward when using public-key cryptography. The electronic sell-through server is given a certificate, signed by the licensing agency of the content protection scheme. The certificate identifies the electronic sell-through server as an authorized server and identifies the public key of the electronic sell-through server. Each time the electronic sell-through server sells a movie, the electronic sell-through server produces a token by signing the media ID with the private key associated with the electronic sell-through server. The electronic sell-through server passes the token and the certificate to the client; the client places the token and the certificate on the disk together with the movie. Every compliant player is required to check that the certificate is valid and signed, that the token corresponds to the actual media ID on the disk, and that the token is signed by the server identified in the certificate.

However, using a public key approach in an electronic sell-through application requires the media recorder of the user to expend a considerable amount of computational overhead when checking the signature. Likewise, the server expends a considerable amount of computational overhead to generate the signatures, limiting the number of transactions per second it can perform. This public key approach further requires additional computational overhead when performing the revocation of servers. This process can create a noticeable delay.

What is therefore needed is a system, a service, a computer program product, and an associated method for cryptographically authenticating data items. Such a system is desired that provides the functionality of a public-key signature without the computation overhead required by public-key cryptography and that ties revocation information to the encrypted content so that revocation cannot be bypassed in an attack. The need for such a solution has heretofore remained unsatisfied.

SUMMARY OF THE INVENTION

The present invention satisfies this need, and presents a system, a computer program product, and an associated method (collectively referred to herein as "the system" or "the present system") for cryptographically authenticating data items. The present system comprises an authentication media key block that comprises a plurality of media key precursors. The present system generates transformed keys by applying a function to a data value and each of the media key precursors individually. The data value is the value the server is attesting to, and, in an exemplary application, is the media identifier of a piece of recordable media. In another exemplary application, it is the cryptographic hash of a message. The present system generates entries in a binding table by applying an encrypting function to a media key associated with an encrypted content and each of the transformed keys.

A media player extracts the media key from the binding table by using the media key precursor it knows and the attested data value. This extraction is a decryption, but unlike a normal decryption, the player needs two keys, not one, to decrypt the media key. One key is the secret media key precursor; the second key is the non-secret attested data value. Once having extracted the media key, the player verifies that the extracted media key matches the media key of the encrypted content, allowing the media device to decrypt and play the encrypted content.

How does the media player learn the media key precursor? In one case, the media key precursors are simply a set of device keys that have been previously assigned to the players as part of the underlying broadcast encryption scheme. In that case, the binding table can be placed in the media key block itself. In another case, the devices process a binding table, which may or may not be in the media key block, which produces a new set of media key precursors.

This invention envisions that the binding table can be applied recursively. In other words, the first binding table is based on media key precursors that are simply device keys, but instead of producing the media key, it produces another set of media key precursors. They in turn can be used in a binding table that either produces the final media key, or produces yet another set of media key precursors. This potential recursion allows the present invention to mimic the "public key infrastructure" nature of a public key system, where entities higher up in the hierarchy attest to certificates (i.e., data values) that are lower in the hierarchy, which, in turn, attest to even lower-level certificates.

The present system may be embodied in a utility program such as a cryptographic authentication utility program. In an exemplary application, a licensing agency provides an authentication media key block and a media key to a content provider. The licensing agency further provides many sets of device keys to a manufacturer of media players and a media ID to a manufacturer of recordable media. The manufacturer of the media player installs a set of device keys in the media player at time of manufacture. The manufacturer of the recordable media installs the media ID onto the recordable media at time of manufacture. For the media player and the recordable media, given the media ID, its device keys, the encrypted content, and the media key, the cryptographic authentication utility generates a binding table that binds the encrypted content to the recordable media such that when the encrypted content and the binding table are downloaded to the recordable media, only predetermined allowable usage of the content by an authorized media player can be performed and unauthorized attacks are mitigated.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

AACS (Advanced Access Content System): This is a consortium of eight companies (Disney, IBM, Intel, Matsushita, Microsoft, Sony, Toshiba, and Warner Bros.) who have specified a copy protection scheme for high definition (blue laser) DVD discs.

Content: copyrighted media such as music or movies presented in a digital format on electronic devices.

CPRM (Content Protection for Recordable Media): This is a technology developed by a consortium founded by four companies (IBM, Intel, Matsushita, and Toshiba) for copy protection on standard-definition DVD recordable discs, Secure Digital flash memory cards, and DVD Audio.

Internet: A collection of interconnected public and private computer networks that are linked together with routers by a set of standard protocols to form a global, distributed network.

World Wide Web (WWW, also Web): An Internet client—the web service provider 35 hypertext distributed information retrieval system.

Figure 1:
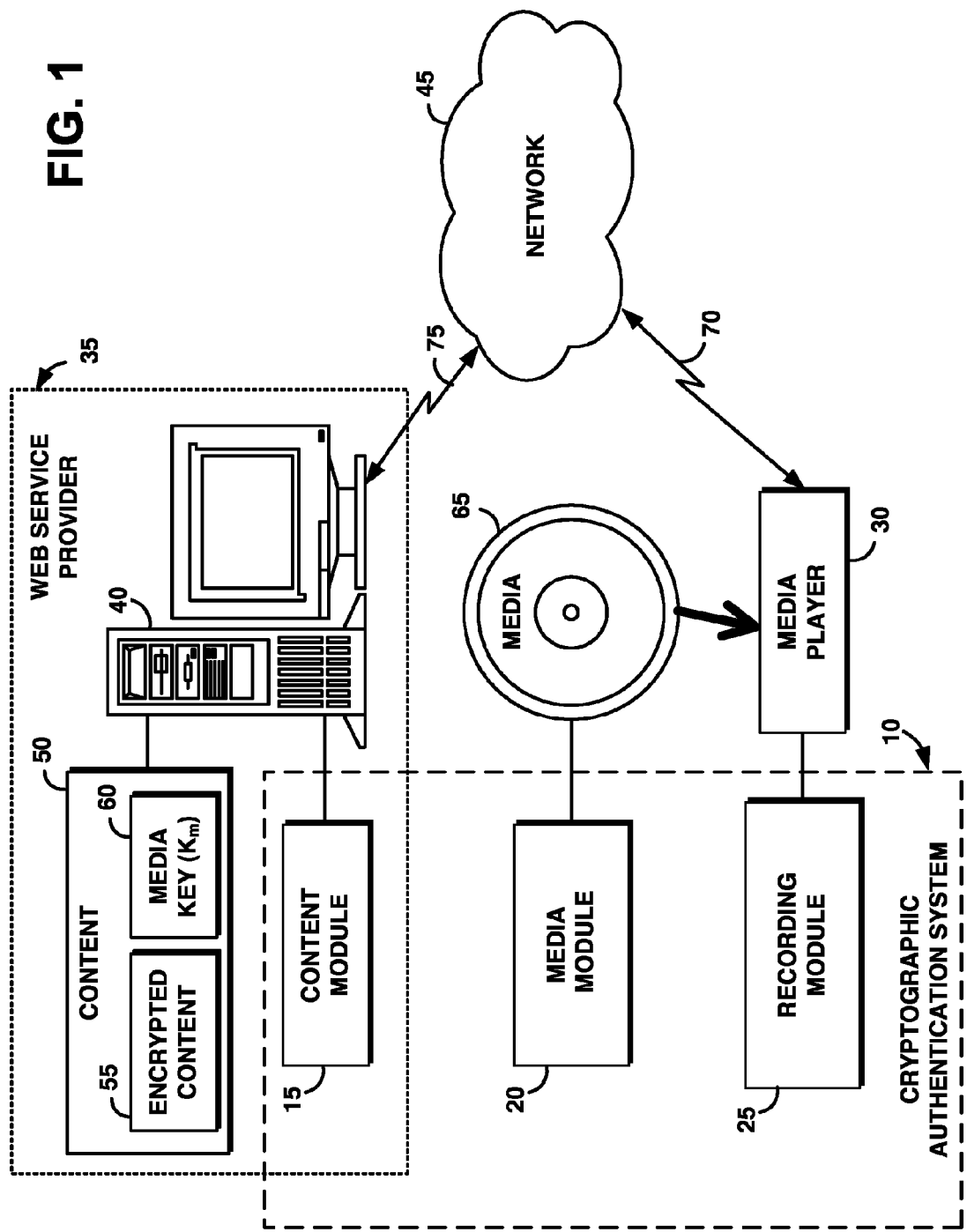
FIG. 1 is a schematic illustration of an exemplary operating environment in which a cryptographic authentication system of the present invention can be used.

FIG. 1 portrays an exemplary overall environment in which a system and method for cryptographically authenticating data items (the cryptographic authentication system 10 or the "system 10") according to the present invention may be used. System 10 comprises a content module 15, a recording module 20, and a media module 25. System 10 comprises a software programming code or a computer program product that is typically embedded within, or installed on a media player 30 and a content source such as a web service provider 35. The content module 15 is installed on a server 40 of the web service provider 35. The recording module 20 is installed on a media player 30. Alternatively, system 10 can be saved on a suitable memory or storage medium such as a diskette, a CD, a DVD, a hard drive, or like devices.

The media player 30 can access the web service provider 35 through a network 45 to obtain a prepared content 50. Content 50 comprises an encrypted content 55 and a media key ($K_m$) 60. The media key 60 (interchangeably referenced herein as $K_m$ 60) allows the media player 30 to decrypt and play content 50 after content 50 has been recorded to media 65.

The media player 30 comprises software that allows the media player 30 to interface with the web service provider 35. The media player 30 comprises any compliant module that can verify the physical presence of a media 65 such as, for example, a disk. A compliant module is one that follows the usage rules that are cryptographically bound to media 65. For example, a compliant recorder does not record content encoded "do not copy".

The media player 30 is connected to network 45 via a communications link 70 such as telephone, cable DSL, satellite link, etc. The web service provider is connected to the network 45 through a communications link 75.

FIG. 1 illustrates an exemplary application of system 10 referenced as "electronic sell-through" in a consumer obtains the prepared content 50 by downloading the prepared content 50 from the web service provider 35 onto a media 65 such as recordable disk in the home of the consumer. While described in terms of an "electronic sell-through" application, it should be clear that system 10 is applicable as well to, for example, any application in which authentication is important and the authenticators are restricted to a subset of the participants. System 10 may be used with a media key block such as, for example, a matrix-based media key block or a tree-based media key block. Furthermore, while illustrated as providing secure encryption of content for delivery to media, it should be clear that system 10 is applicable as well to, for example, any type of content delivery.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
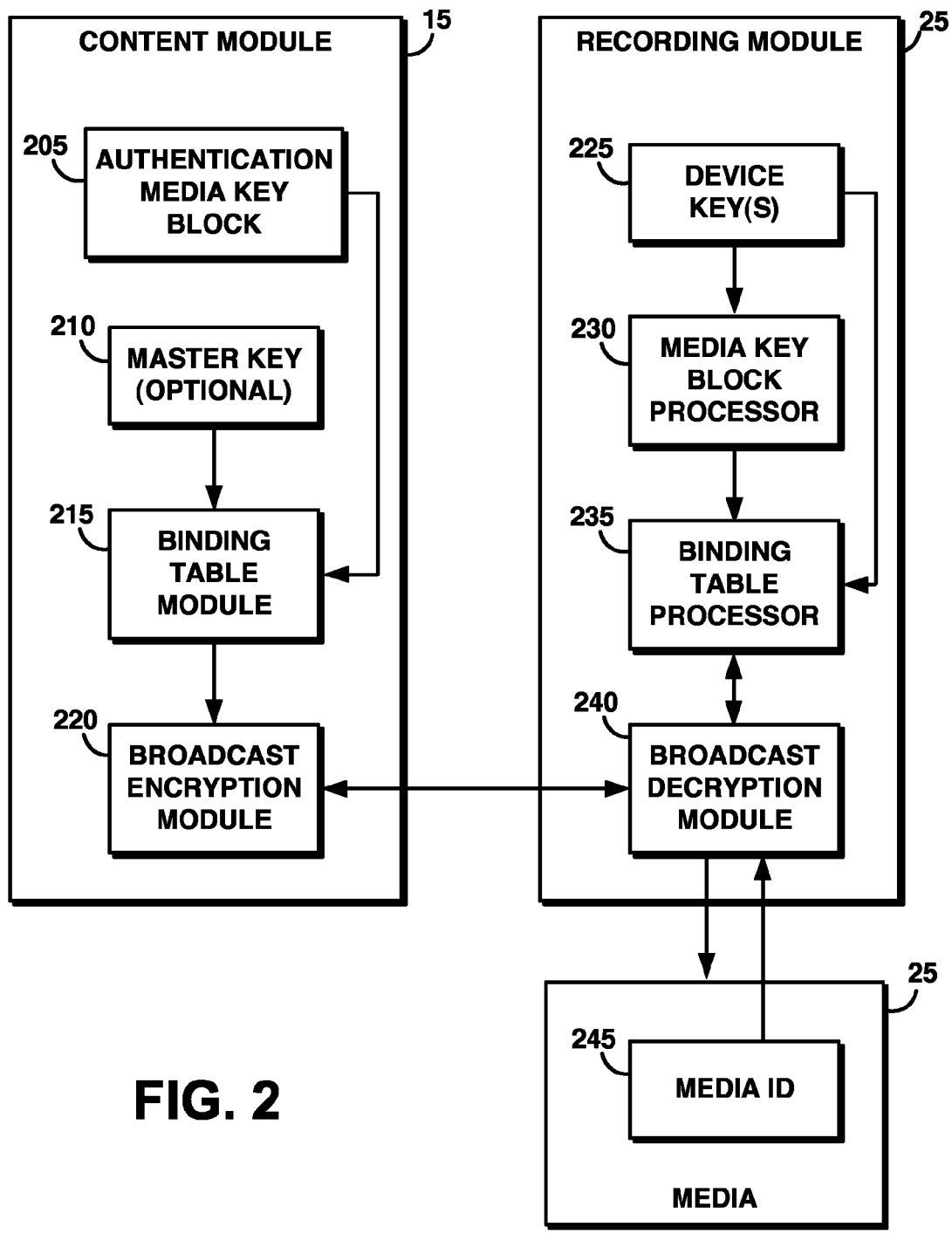
FIG. 2 is a block diagram of the high-level architecture of the cryptographic authentication system of FIG. 1.

FIG. 2 illustrates an exemplary high-level hierarchy of system 10 in the exemplary application of electronic sell-through, as illustrated by FIG. 1. The content module 15 comprises an authentication media key block 205, an optional master key 210, a binding table module 215, and a broadcast encryption module 220. The recording module 20 comprises one or more device keys 225, a media key block processor 230, a binding table processor 235, and a broadcast decryption module 240. The media key block processor 230 further comprises a subset-identifying part 232 and a key decryption part 234. Media 65 comprises a media ID 245.

Figure 3:
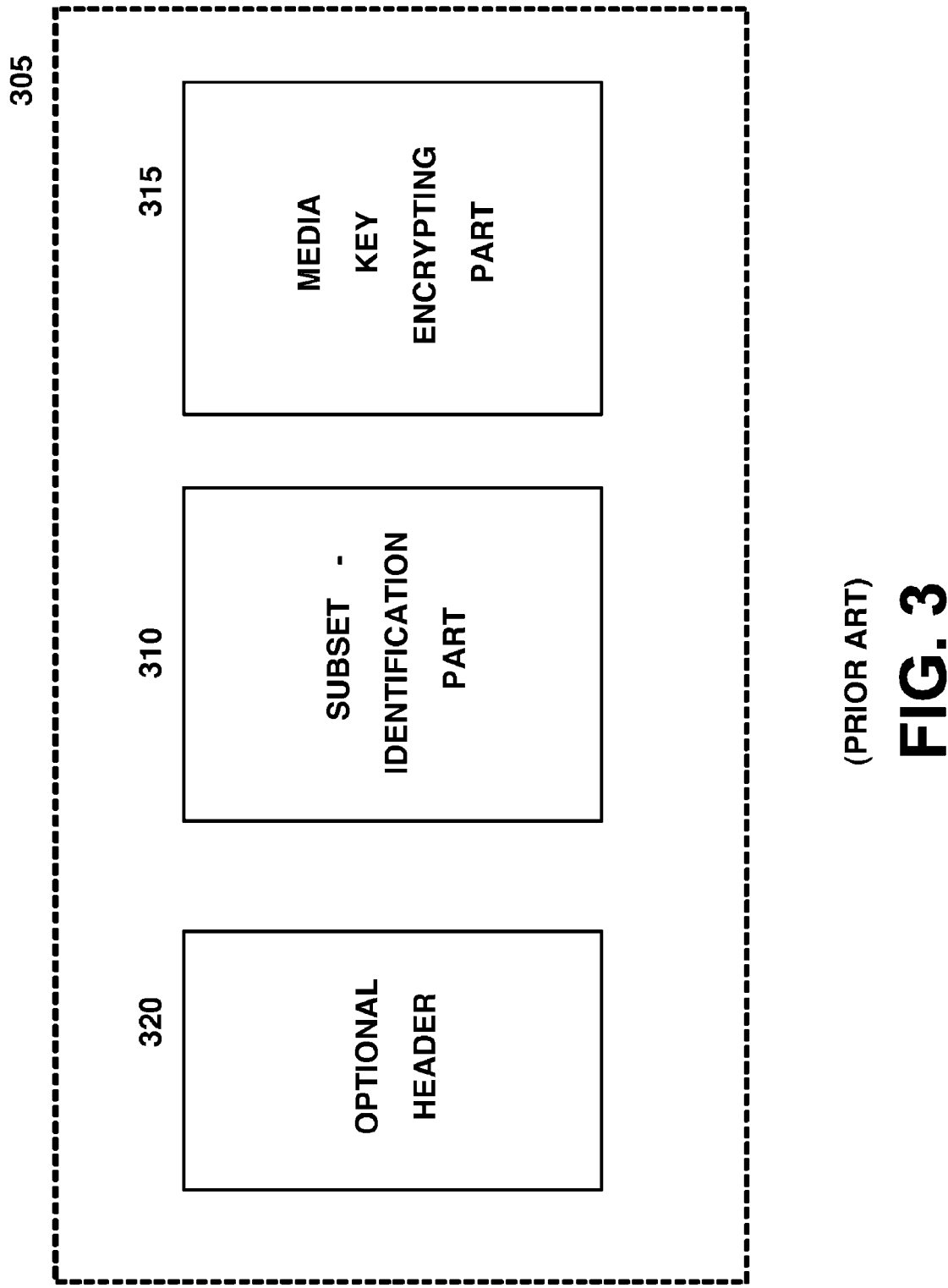
FIG. 3 is a block diagram of a prior art media key block.

FIG. 3 illustrates a conventional media key block 305. It comprises a subset identifying part 310, media key encrypting part 315, and an optional header 320. The subset identifying part 310 lists various subsets of devices in the set of all unrevoked (or non-revoked) devices in the system. How the subsets are designed differ from one broadcast encryption scheme to another; all such schemes are within the scope of this invention. Each subset is associated with a key, called variously a device key or a key encrypting key. We will use "device key" terminology in this invention. A device knows the device key for every subset it is a member of. In effect, the subset identifying part 310 denote individual device keys.

Figure 6:
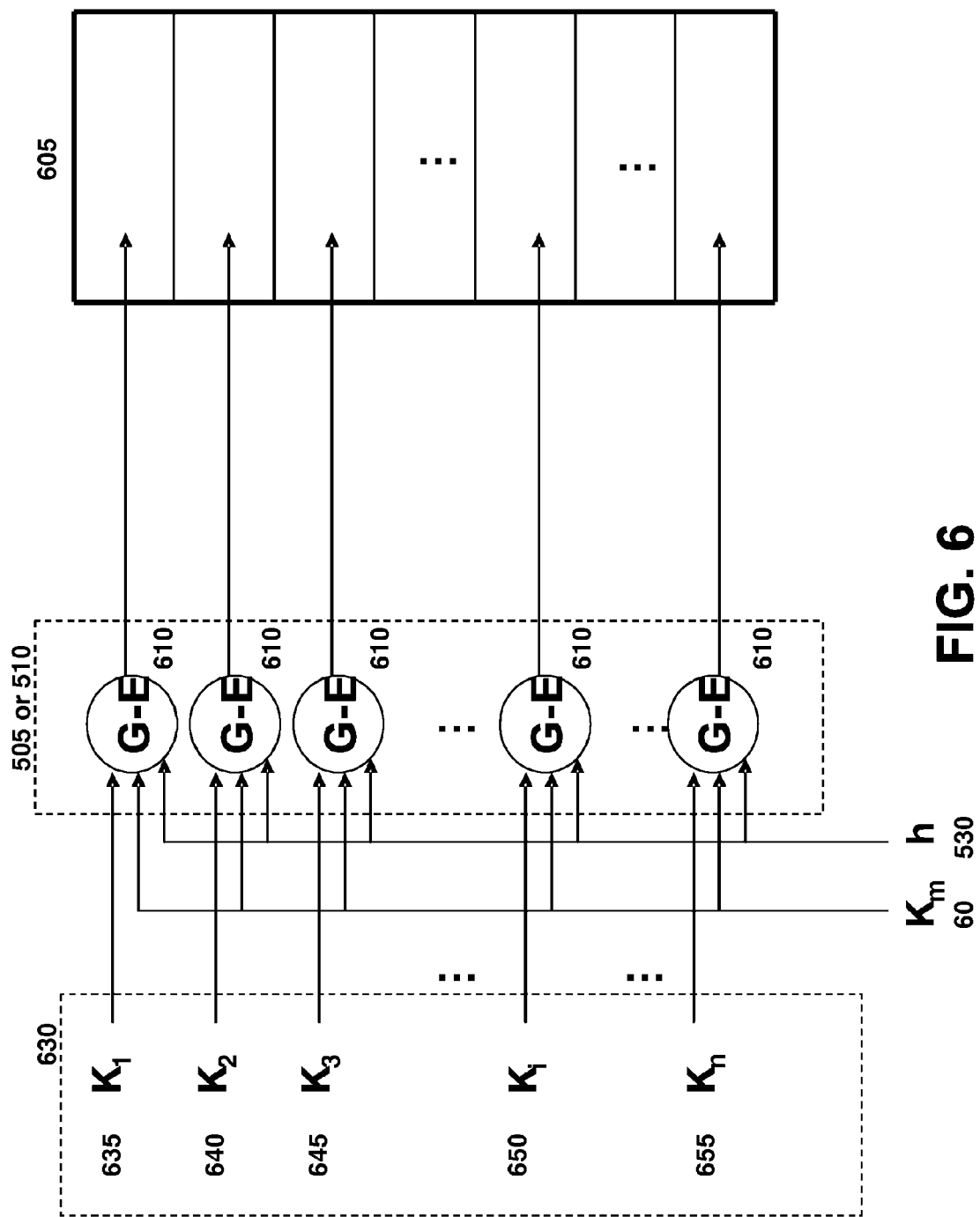
FIG. 6 is a block diagram illustrating the generation of an exemplary binding table of the cryptographic authentication system of FIGS. 1 and 2 used to encrypt and decrypt a media key for managing encrypted information.
Figure 7:
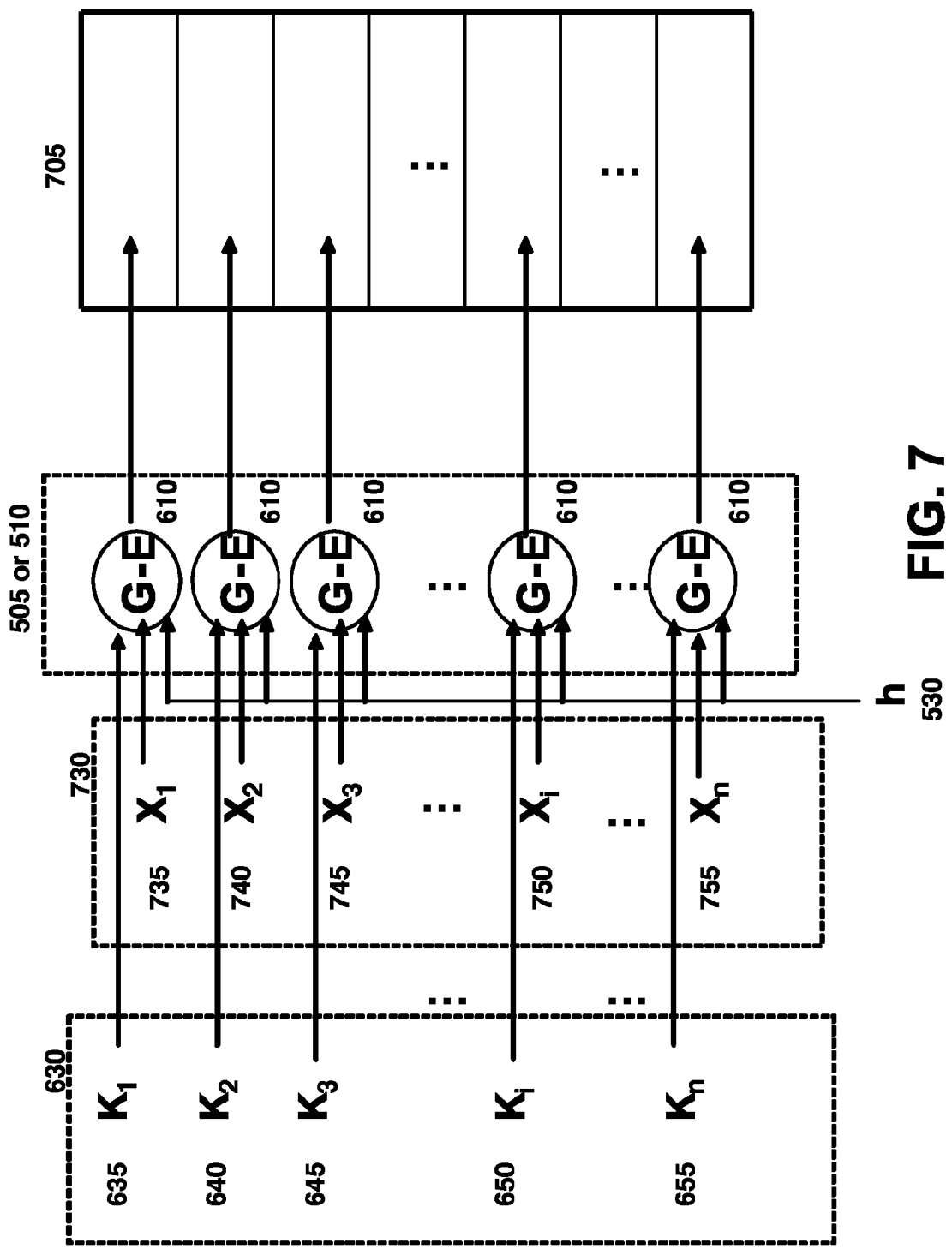
FIG. 7 is a block diagram illustrating the generation of an exemplary binding table of the cryptographic authentication system of FIGS. 1 and 2 used to encrypt and decrypt media key precursors for use in a binding table of FIG. 6.

The media key encrypting part 315 is the second part of the media key block 305 in the prior art. It contains the encryption of the media key in each of the device keys identified in the subset identifying part 310. One aspect of the present invention is to replace the media key encrypting part 315 in the media key block 305 with the binding table, two versions of which are shown in FIG. 6 and FIG. 7 respectively, which illustrate a media key block with such a substitution is called an authentication media key block 205.

The media key block 305 may optionally comprise a header 320 that can include, for example, such data items as the version number and type of the media key block.

Figure 4:
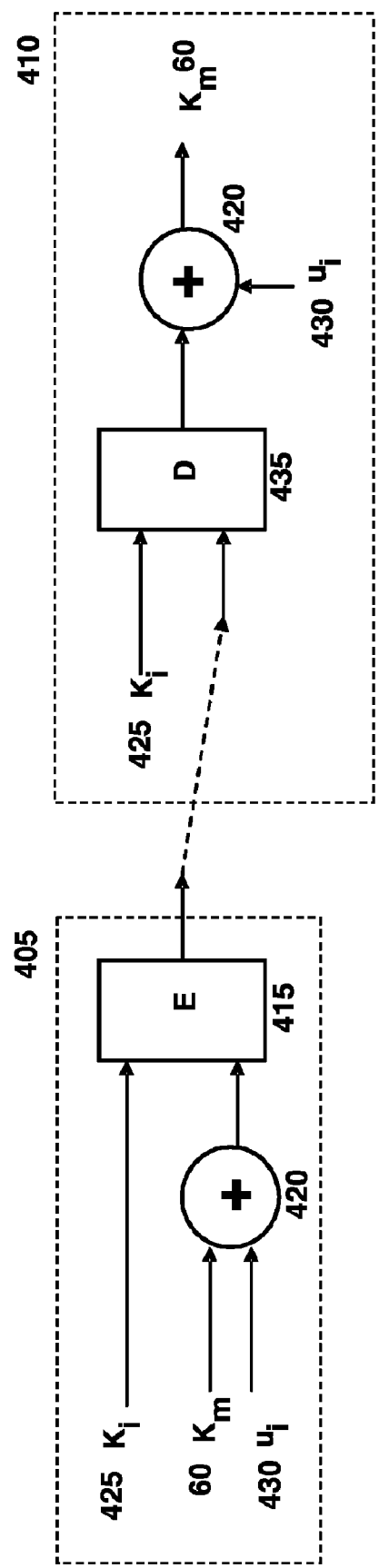
FIG. 4 is a block diagram illustrating an encryption and decryption function in the prior art media key block of FIG. 3.

FIG. 4 illustrates the encryption function 405 typically used to encrypt the media key in the media key encrypting part 315 media key block 305 in the prior art. It also illustrates the decryption function 410 used by a device to decrypt the media key based on the particular device subset it is a member of.

The media key encryption function 405 has three inputs: device key $K_i$ 425, media key $K_m$ 60, and subset identifier $u_i$ 430. The device key $K_i$ 425 is for the same subset as the one identified by subset identifier $u_i$ 430. The media key $K_m$ 60 and the subset identifier $u_i$ 430 are combined with an exclusive-or block 420. The output of the exclusive-or block 420 is sent to the encryption block E 415, which then encrypts it using the device key $K_i$ 425. The encryption block E 415 can use any normal symmetric cipher, such as Data Encryption Standard (DES) or Advanced Encryption Standard (AES).

The media key decrypting module 410 is the inverse of the media key encrypting function 405. The output of a media key encryption function 405 is decrypted with a standard decryption block D 435 using device key $K_i$ 425. The output of the decryption is passed to an exclusive-or block 415 and exclusively ORed with the subset identifier $u_i$ 430. The result is the media key $K_m$ 60.

In both the media key encrypting module 405 and the media key decrypting function 410, the subset identifier $u_i$ 430 and the exclusive-or block 415 prevent a cryptographic attack called the birthday paradox attack. In some prior art systems, these elements are omitted.

Figure 5:
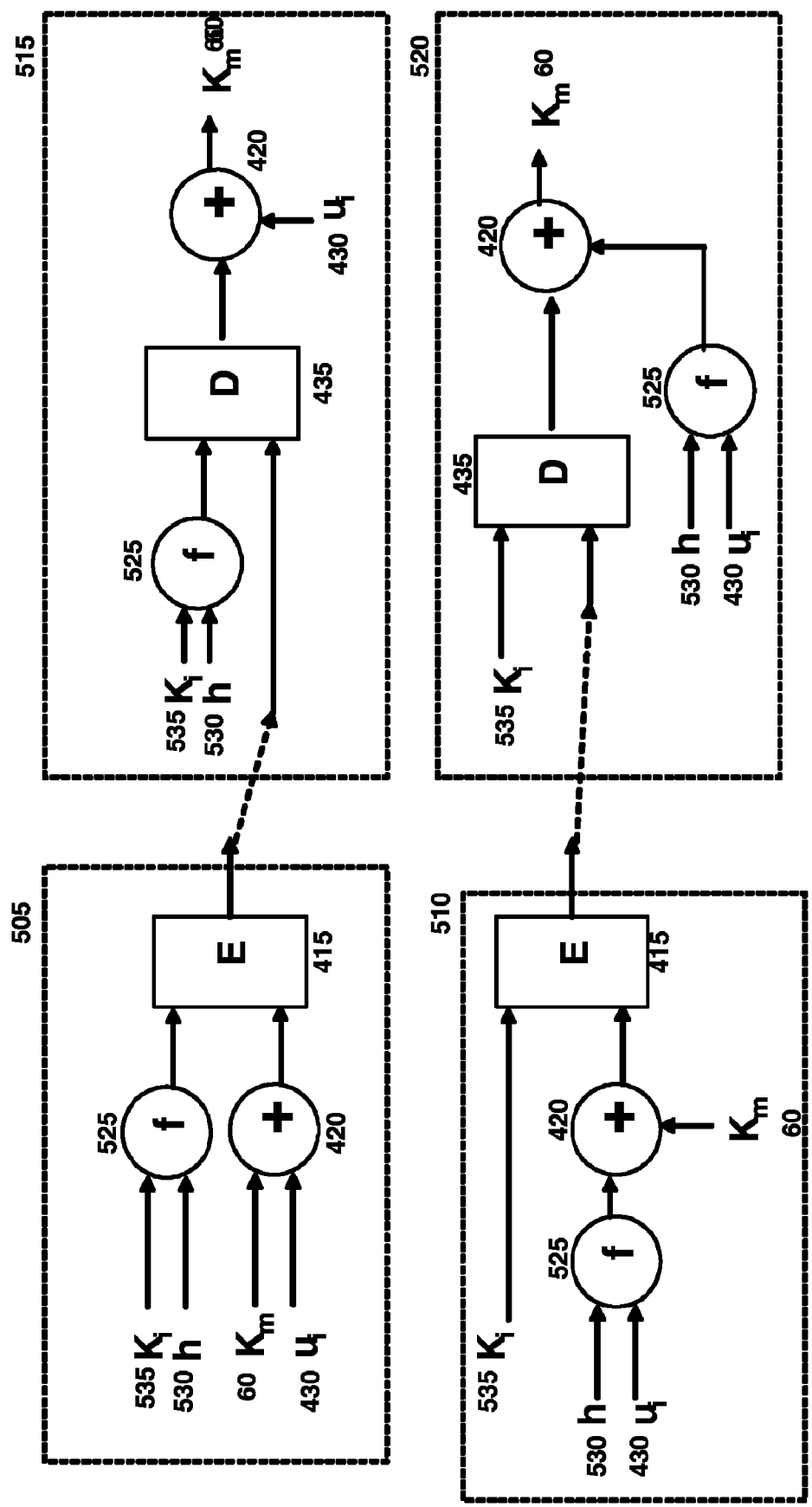
FIG. 5 is an exemplary diagram an encryption and decryption function according to the present invention.

FIG. 5 illustrates the improved media key encrypting modules 505 and 510, and the improved media key decrypting modules 515 and 520, which provide the authentication feature of this invention. Compared to the prior art functions 405 and 410, these functions add an additional input, a data value h 530. This is the data value being attested to, and in a preferred embodiment is the media ID 245.

The data value h 530 acts as an additional key in the encryption and decryption modules. Cryptographers recognize that an additional key can be added to a single-key encrypting function in one of two ways: either by exclusively ORing the two keys together before encrypting the data with the result, or by exclusively ORing the data with one of the keys before encrypting by the other. Thus, there are two versions of these encryption and decryption modules.

Media key encrypting module 505 corresponds to combining the keys. The device key $K_i$ 425 has been replaced by a more general term, the media key precursor $K_i$, denoted as 535. Media key precursor $K_i$ 535 may be a device key 425 or it may come from a binding table as shown in FIG. 7. Media key precursor $K_i$ 535 is combined with data value h 530 using a combining function f 525. The combining function f 525 may be exclusive-or or a similar function like addition or subtraction. Also, since the data value h 530 is not a secret, additional cryptographic strength can be gained if the combining function f 525 is derived from an encryption function like DES or AES.

The output of the combining function f 525 is used as a key to the encryption block E 415. The data for the encryption block is the output of the exclusive-or block 420. The inputs for the exclusive-or block 420 are the subset identifier $u_i$ 430 and media key $K_m$ 60.

The media key encrypting module 510 corresponds to the other common way to do an encryption with two keys: combining the data with one of the keys while encrypting with the other. In this case, data value h 530 is combined with subset identifier $u_i$ 430 using a combining function f 525. The output of this combining function f 525 is exclusively ORed with the media key $K_m$ 60 in block 420. The output of the excusive-or 420 is fed to encryption block E 415 to be encrypted, using media key precursor $K_i$ 535.

The media key decrypting modules 515 and 520 are the inverses of the media key encrypting modules 505 and 510 respectively. Also, as in the prior art, the subset identifier $u_i$ 430 and its connecting blocks may be omitted if the birthday paradox attack is not significant in a particular application, without departing from this invention.

FIG. 6 illustrates generation of a binding table 605 (interchangeably referenced herein as the media key binding table 605) by the binding table module 215 using the media key precursors 535. The media key precursors 535 are shown in FIG. 6 as a $K_1$ 635, a $K_2$ 640, a $K_3$ 645, a $K_i$ 650, through a $K_n$ 655, collectively referenced as media key precursors 535, and generally referenced as $K_i$ 535. In the case that the binding table 405 replaces the media key encrypting part 315 of the authentication media key block 205, the media key precursors are the device keys identified in the subset identifying part 310. In the case that binding tables are being used recursively, the media key precursors 535 come from another binding table such as shown in FIG. 7.

In FIG. 6, the G-E blocks 610 correspond to one of the media key encrypting modules 505 or 510 in FIG. 5. For ease of understanding, and because they are optional, the G-E blocks 610 do not show the subset identifiers $u_i$ 430 as inputs. The subset identifiers $u_i$ 430 may be present, and each subset identifier $u_i$ 430 corresponds to the associated media key precursors $K_i$ 535.

In FIG. 6, the other inputs to the G-E blocks 610 are the media key $K_m$ 60 and the attested data value h 530, as shown in this figure and in FIG. 5.

Any device, knowing a single media key precursor $K_i$ 535, its associated subset identifier $u_i$ 430, and the attested value h, can calculate the media key 60 by using the decryption module 515 or 520 associated with the particular encryption module 505 or 510 represented by the block G-E 610 in FIG. 6.

In addition, only a server or the licensing agency, which knows all the media key precursors, can correctly produce a completely correct binding table 605. For the example application of protecting media, the binding table mechanism would work as follows: For each download of content from the web service provider 35 to media 65, the binding table module 215 encrypts the media key 60 using media key encrypting modules 505 or 510, the media key precursor $K_i$ 535, and the media ID 245 as the attested value h 530.

The media key 60 protects content 50 from unauthorized use; an unencrypted version of the media key 60 is required to play content 50 after content 50 has been recorded onto media 65. The binding table module 215 uses the media key encrypting module 505 or 510 to encrypt the media key $K_m$ 60, generating the binding table 605. In the exemplary system, the binding table 605 comprises a table of the media key ($K_m$) 60, transformed many times with many different media key precursors 535, subset identifiers 430, the media ID 245 acting as the attested value h 530, and the media key encrypting module 505 or 510. The broadcast encryption module 220 then transmits the binding table 605 with the content 50 to the media player 30 for recording on media 65.

FIG. 7 illustrates a scheme for generating a recursive binding table 705. The recursive binding table 705 is a binding table so generated that it creates new media key precursors 535 which can be used in yet another binding table 605 or 705. FIG. 7 shows the generation of the recursive binding table 705 which, instead of producing a single media key 60, produces a new set of output media key precursors, shown as 730.

In FIG. 7, like elements are given the same numbers as in FIG. 6. The new elements are the output media key precursors 730. The output media key precursors are shown in FIG. 7 as an $X_1$ 735, an $X_2$ 740, an $X_3$ 745, an $X_i$ 750, through an $X_n$ 750, collectively referenced as output media key precursors 730, and generally referenced as $X_i$ 730. The output media key precursors 730 are simply random values generated by the entity creating the recursive binding table 705.

In FIG. 7, G-E blocks 610 use as an input the corresponding output media key precursor $X_i$ 730 instead of the media key 60. Note that only the licensing agency should know all the device keys in the system, or the system is insecure. Thus, a binding table 705 which uses device keys as media key precursors 535, namely the binding table replacing the media key encrypting part 315 in the authentication media key block 205, can only be produced correctly by the licensing agency. If the licensing agency generates the binding table in the way illustrated in FIG. 7, a new set of media key precursors 730 are generated, which may be passed on to a server or other entity without compromising the security of the system as a whole. That entity can now generate another binding table 605 or a recursive binding table 705. Those binding tables would not be part of the authentication media key block 205, but would be associated with it.

In the foregoing example, a licensing agency provides to the web service provider 35 the output media key precursors 730 with binding table 705 in the authentication media key block 205. The attested data value h 530 in that binding table 705 could be, for example, a hash of the header 320 of the authentication media key block 205. Or, it might be a hash of some other system parameters.

In one embodiment, the output media key precursors 730 are one-way functions of a single master key, e.g., the master key 210. For example, the media key precursors 730 may be an encryption of the subset identifier $u_i$ 430 encrypted with the master key 210. In this embodiment, the licensing agency can send the master key 210 to the web service provider 35, instead of the output media key precursors 730.

In another embodiment, the master key 210 can be read by the web service provider 35 from the authentication media key block 205 using device keys of the web service provider 35. In this embodiment, some or all of the device keys of the web service provider 35 are placed in a single subset of the authentication media key block 205; say subset $u_j$. In that case, the output media key precursor $X_j$ associated with that subset would, in fact, be the master key 210.

Figure 8:
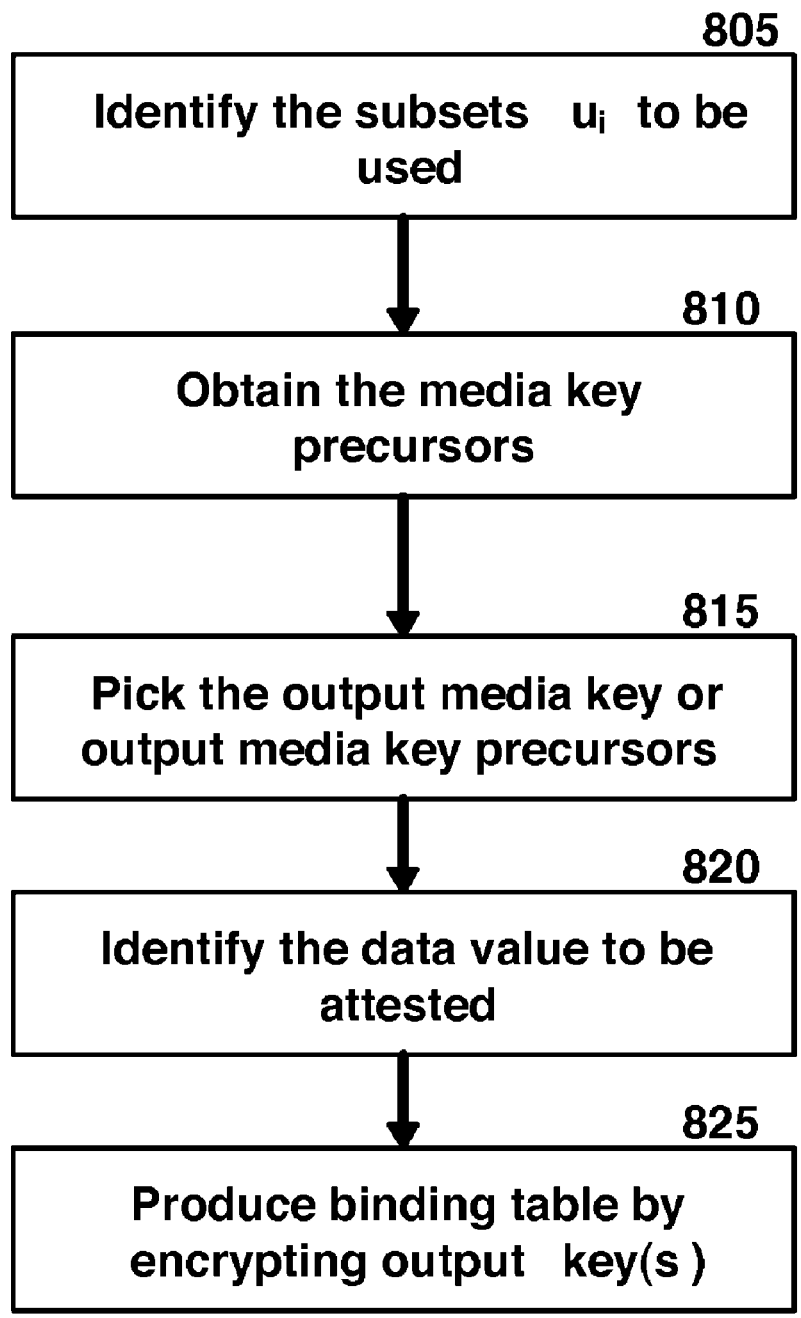
FIG. 8 is a process flow chart illustrating a method of operation of a content module of the cryptographic authentication system of FIGS. 1 and 2 in generating binding tables.

FIG. 8 illustrates a method 800 of the content module 15 or a licensing agency in generating a binding table. The content module 15 would identify the subsets by processing the subset identifying part 310 of an authentication media key block 205 obtained from the licensing agency (step 805). It would obtain the media key precursors (step 810), which would be the output of a recursive binding table 705. The content module 15 could have received these media key precursors 535 from the licensing agency when it received the authentication media key block 205. Alternatively, it could process the media key block to obtain a master key 210, and use the master key to derive the media key precursors 535.

The content module 15 would pick the output keys (step 815). These may be a single media key 60 or a set of output media key precursors 730. The content module 15 may pick the keys randomly, or they may be assigned by the licensing agency. In the case that the keys are output media key precursors 730, and the content module 15 chooses to use an output master key, it would generate the master key randomly and would calculate all the media key precursors from that.

The content module 15 would identify the attested data value 530 (step 820), which might be, for example, the media ID 245. Using the attested data value identified in step 820, the media key precursors identified in 810, the subsets identified in step 805, and the output key or keys picked in step 815, the content module 15 would encrypt the keys using the key encrypting function 505 or 510 (step 825).

If the licensing agency were generating the binding table, it would go through the same steps. However, some of the details are slightly different. The licensing agency identifies the subsets (step 805) in the way that allows it to exclude compromised devices, according to the particular broadcast encryption scheme in use. For the licensing agency, the media key precursors (step 810) are always the device keys. The remaining steps are identical.

Figure 9:
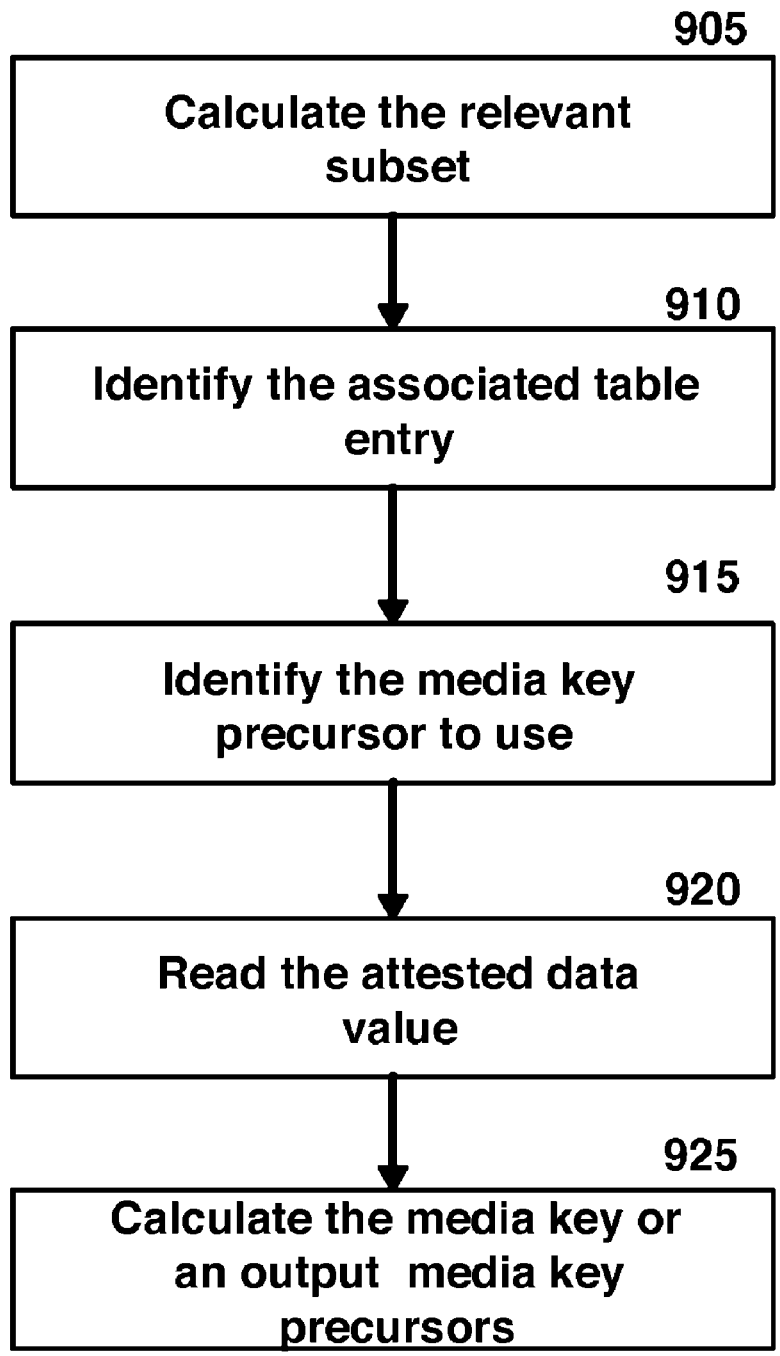
FIG. 9 is a process flow chart illustrating a method of operation of a content module of the cryptographic authentication system of FIGS. 1 and 2 in processing the binding table.

FIG. 9 illustrates a method 900 of a binding table consuming module, for example a media player 30, to process the binding table 605 or 705. In step 905, the media player 30 processes the authentication media key block 205, to locate which subset it is a member of. Using that subset identified in step 905, the media player 30 would determine which entry it should process in binding table 605 or 705 (step 910). Likewise using that subset identified in step 905, the media player 30 will determine which input media key precursor 535 to use, either his device key for that subset, or an output media key precursor from a previously processed binding table (step 915).

In step 920, the media player 30 would read the attested data value 530, for example, it could read the media ID 245 from the media 25. In step 925, using the subset identified in step 905, the media key precursor identified in step 915, and the attested data value read in step 920, the media player 30 would decrypt the entry in the table it determined in step 910. It would use the one of the key decrypting modules 515 or 520, depending on which corresponding module (505 and 510 respectively), where used when the table was created. The binding table might have a header that would signal which module was used; alternatively, the system might pick one style of module universally.

The decryption in step 925 would either be the media key 60, allowing the media player 30 to process the content 50. Alternatively, it might be a media key precursor to be used in processing a further binding table. Eventually, in this case, the last binding table processed would reveal the media key 60.

If the attackers were to modify the attested data value 530, for example, by making an unauthorized copy of the content 50 onto another piece of media 25, the media player 30 will calculate the incorrect key in step 925, and will not be able to process the content 50. That is the desired behavior; the attackers are unable to successfully make a playable unauthorized copy.

If attackers have a set of normal device keys, the attacker can only correctly produce one entry in the binding table 605 or the recursive binding table 705. The other entries are invalid. Therefore, the attackers can produce content such as movies that play on only a limited number of media players such as media player 30. Consequently, the attackers' market is substantially reduced and the unauthorized copies produced by the attackers inherently reveal important forensic information. If an attacker mounts an attack, the licensing agency can simply produce new authentication media key blocks 205 where the subset that the attacker is using is subdivided with many more media key precursors 430. The attack can rapidly be made unprofitable and dangerous for the attackers.

Consider the following attack: the attackers take a conventional media key block that they have broken and pretend that the broken media key block is an authentication media key block 205. Because there is only a single key in this authentication media key block 205, the attackers can correctly produce the entire binding table 605. This attack is impossible in AACS because media key blocks are signed, and authentication media key blocks have a different type. However, public key cryptography is not required to prevent this attack. The binding table 705 in the authentication media key block 205 could attest that it is a valid authentication media key block, for example, by denoting it as such in the header 320 and attesting to the hash of the header. In the absence of such an attestation from the licensing agency, the media player 30 would not accept the attacker's bogus authentication media key block.

Because attackers can create binding tables that would appear correct to a limited set of devices (devices that are in the same subset(s) as the attacker), the following device rule is useful in practicing this invention: if a device is faced with two binding tables with contradictory attestations, the device should trust the binding table in which they are in the smaller subset.

It is to be understood that the specific embodiments of the invention that have been described are merely illustrative of certain applications of the principle of the present invention. Numerous modifications may be made to the system and method for cryptographically authenticating data items described herein without departing from the spirit and scope of the present invention. Moreover, while the present invention is described for illustration purpose only in relation to the WWW, it should be clear that the invention is applicable as well to, for example, to an intranet, a wide area network, or any other network in which devices may be interconnected for communications purposes. It should also be clear that the applicability of the present is not limited to the application of content protection, but is, in fact, applicable to any broadcast-encryption-based cryptographic system in which needs to attest (or sign) data values.

What is claimed is:

1. A computer implemented method of generating a media key, comprising:
   selecting a list of subsets of devices in the broadcast-encryption-based system;
   selecting a plurality of media key precursors, each media key precursor being associated with a selected subset of devices; and
   generating a recursive binding table by transforming a plurality of output keys for use in a second binding table based the media key precursors and a data item to be authenticated.

2. The method of claim 1, wherein the plurality of output keys include a single media key.

3. The method of claim 1, wherein the plurality of output keys are derived from a master key.

4. The method of claim 1, wherein transforming the plurality of output keys is based on an exclusive OR of the media key precursor and the data item to be authenticated.

5. The method of claim 4, wherein transforming the plurality of output keys further includes using identifiers for the subsets of devices.

6. The method of claim 1, wherein selecting the selected subset of devices is based on a subset-difference broadcast encryption.

7. The method of claim 1, further comprising receiving the plurality of media key precursors.

8. The method of claim 7, wherein the plurality of media key precursors are output keys of another binding table.

9. The method of claim 1, further comprising receiving the plurality of media key precursors from a licensing server.

10. The method of claim 9, further comprising calculating the plurality of media key precursors from a master key.

11. A computer program product including a plurality of executable instruction codes that are stored on a non-transitory computer usable medium, for generating a media key, comprising:
- a program code for selecting a list of subsets of devices in the broadcast-encryption-based system;
- a program code for selecting a plurality of media key precursors, each media key precursor being associated with a selected subset of devices; and
- a program code for generating a recursive binding table by transforming a plurality of output keys for use in a second binding table using different ones of the media key precursors, based on the media key precursors and the data item to be authenticated.

12. The computer program product of claim 11, wherein the plurality of output keys include a single media key.

13. The computer program product of claim 11, wherein the plurality of output keys are derived from a master key.

14. The computer program product of claim 11, wherein the program code for generating the binding table transforms the plurality of output keys based on an exclusive OR of the media key precursor and the data item to be authenticated.

15. The computer program product of claim 14, wherein the program code for generating the binding table transforms the plurality of output keys by using identifiers for the subsets of devices.

16. A computer-implemented method of generating a media key, comprising:
- selecting a list of subsets of devices in the broadcast-encryption-based system;
- selecting a plurality of media key precursors, each media key precursor being associated with a selected subset of devices; and
- generating a recursive binding table such that the binding table generates additional media key precursors for use in a second binding table, by transforming a plurality of output keys based on a media key precursors and the data item to be authenticated.

17. The method of claim 16, wherein the plurality of output keys include a single media key.

18. The method of claim 16, wherein the plurality of output keys are derived from a master key.

19. The method of claim 16, wherein generating the binding table transforms the plurality of output keys based on an exclusive OR of the media key precursor and the data item to be authenticated.

20. The method of claim 19, wherein generating the binding table transforms the plurality of output keys by using identifiers for the subsets of devices.

21. A computer implemented method of generating a media key, comprising:
- selecting a list of subsets of devices in the broadcast-encryption-based system;
- selecting a plurality of device keys, each device key being associated with a selected subset of devices;
- generating a binding table by transforming a plurality of first output keys based on the device keys and a data item to be authenticated, wherein the transformed output keys are media key precursors; and
- generating a recursive binding table by transforming a second set of output keys based on the media key precursors and the data item to be authenticated; and
- using the second set of transformed output keys to produce a final media key OR using the second set of transformed output keys to produce one or more additional recursive binding tables, wherein a set of output keys of the final recursive binding table of the one or more additional recursive binding tables is used to produce a final media key.

* * * * *